Patented Apr. 4, 1944

2,345,625

UNITED STATES PATENT OFFICE 2,345,625

PROCESS OF DEHYDRATING DIALKYL ARYL CARBINOLS

Robert C. Palmer and Carlisle H. Bibb, Pensacola, Fla., assignors to Newport Industries, Inc., Pensacola, Fla., a corporation of Delaware No Drawing. Application November 30, 1940, Serial No. 368,046

2 Claims. (Cl. 260—669)

This invention relates to a method for the catalytic dehydration of tertiary alcohols yielding unsaturated hydrocarbons and water.

Prior art catalytic methods of dehydrating tertiary alcohols give poor yields of unsaturated hydrocarbons, for the dehydration catalysts also promote a continuous polymerization of the unsaturated hydrocarbons as the latter are formed. It has heretofore been proposed to dehydrate tertiary alcohols by passing the same in vapor form through a hot chamber filled with lumps of dehydrating catalyst, and then to condense the resulting product and separate the water therefrom. But even according to this method large amounts of polymers are formed, cutting down the yield of unsaturated hydrocarbons correspondingly, and ethers also tend to form bothersome by-products.

We have found that a liquid phase catalytic dehydration of tertiary alcohols coupled with continuous separation by distillation of the unsaturated hydrocarbon as it is formed eliminates polymerization and ether formation almost completely, to give excellent yields of the desired unsaturated hydrocarbons.

It is therefore an important object of this invention to provide a liquid phase catalytic method of dehydrating tertiary alcohols, including the step of distilling off unsaturated hydrocarbons as they are formed, to avoid polymerization.

Other and further important objects of the present invention will become apparent from the following description and appended claims.

When proceeding in accordance with this invention, the tertiary alcohol to be dehydrated is placed in a still equipped with a fractionating column and distillation is conducted in the presence of a dehydration catalyst. The pressure is regulated so that, as a result of a marked difference in boiling points between tertiary alcohols and the unsaturated hydrocarbons produced by their dehydration, the products of the liquid phase dehydration are volatilized selectively and removed from the effective range of the catalyst. Any tertiary alcohol volatilized along with the products of the dehydration is separated therefrom by the column and returned to the still. Such fractional distillation and return of tertiary alcohol is effected continuously. A very high yield of the simple monomeric unsaturated hydrocarbon is obtained. This high yield is probably due to the fact that, since the rate of distillation keeps pace with the rate of dehydration, there is at no time any substantial concentration of unsaturated hydrocarbon contacting the catalyst.

Of the many well known dehydration catalysts such as iodine, acidic salts, acids, earths, silica compounds and adsorbent materials, a mild catalyst, in particular, carbon is preferred, either in activated form or as graphite, especially where the unsaturated hydrocarbon formed has tendency to polymerize, or when ethers tend to be formed.

The following example illustrates the dehydration of a typical tertiary alcohol according to the present invention.

Dimethyl tolyl carbinol was dehydrated to para-methyl-alpha-methyl styrene and water in an apparatus including a still of 127 gallons capacity fitted with an efficient fractionating column and condenser and connected to a vacuum pump. The still was charged with 416 pounds technical grade dimethyl tolyl carbinol containing about 77 per cent pure dimethyl tolyl carbinol, the remainder consisting of 6 per cent cymene together with 15 percent para methyl acetophenone. The cymene was fractionated off and 1.4 pounds of activated carbon was added. The vacuum was adjusted to about 53 millimeters of mercury and the content of the still heated to 129° C. Dehydration of the carbinol as well as distillation started at this temperature.

The following readings were taken as the dehydration proceeded:

| Time | Still temp. | Column temp. | Pressure | Weight of distillate | |
|---|---|---|---|---|---|
| | | | | Oil | Water |
| | °C. | °C. | Mm. | Lbs. | Lbs. |
| 12:25 | 131 | 77 | 53 | 92.5 | 21 |
| 2:31 | 142 | 86 | 53 | 104.5 | 9.5 |
| 4:10 | 145 | 97 | 37.5 | 56.5 | 5.0 |

The final still residue weighed 97 pounds and contained some para-methyl-alpha-methyl styrene that had not been forced out through the column. The bulk of the residue consisted of para methyl acetophenone.

A fractional distillation of the para-methyl-alpha-methyl styrene distillate yielded para-methyl-alpha-methyl styrene of high purity.

As will be apparent to those skilled in the art, batch dehydrations as typified by this specific example can be carried out at other temperatures and pressures as well, so long as selective removal of dehydration products is effected. Continuous dehydration can be carried out at similar temperatures and pressures.

Cymene and para-methyl acetophenone are present in commercial dimethyl tolyl carbinol. These substances exert no influence on the course of the dehydration, which proceeds as smoothly or even better when pure tertiary alcohols are treated.

The present method is applicable generally for the preparation of styrenes from dialkyl aryl carbinols. Dimethyl phenyl carbinol, when dehydrated in this manner, yields alpha methyl styrene. The dimethyl xylyl carbinol yields the corresponding xylyl derivative. Tertiary terpene alcohols, such as the terpinenols, yield the corresponding terpenes and water. Alpha terpineol is most suitably dehydrated by means of a more active catalyst, for instance, fuller's earth or magnesium trisilicate. Aliphatic alcohols, such as amyl or butyl alcohols, yield the corresponding unsaturated aliphatic hydrocarbons.

An essential feature of the process is the regulation of the pressure over the material being dehydrated, so that fractional distillation of the products of the dehydration is effected within the dehydration range of the alcohol. This pressure may be either subatmospheric or superatmospheric. In the case of high boiling alcohols a vacuum is used. Some tertiary alcohols dehydrate more easily than others and consequently can be treated at a lower temperature. Some catalysts are reactive at lower temperatures than others. The exact operative conditions to be used are determined by the natures of the alcohol to be dehydrated and the catalyst used, and are dependent upon the relationship of the capacity of the column to the rate of production of dehydration products, upon the time within which it is desired to complete a run, and upon like factors.

Not only should the pressure be regulated to effect vaporization of the products of the dehydration at the dehydration temperature while reducing to a minimum the amount of alcohol vaporized simultaneously, but the rate of distillation should be sufficiently rapid, or vigorous, to reduce at all times to a minimum the concentration of unsaturated hydrocarbons present in the still.

Since many details of the process can be varied within a wide range without departing from the principles of this invention, it is not our purpose to limit the patent granted on this invention otherwise than necessitated by the scope of the appended claims.

We claim as our invention:

1. The method of preparing para-methyl-alpha methyl styrene from dimethyl tolyl carbinol which comprises heating said carbinol in the presence of carbon at a temperature of from 129° C. to 145° C. under a pressure of from 37 to 53 millimeters of mercury and fractionally distilling off said styrene as said styrene is formed.

2. The method of preparing a styrene from a dialkyl aryl carbinol which comprises dehydrating said dialkyl aryl carbinol in the liquid phase at an elevated temperature in the presence of a carbon catalyst while inhibiting ether formation and polymerization as well as effecting selective volatilization of the styrene formed in said dehydration by maintaining a subatmospheric pressure above said carbinol and fractionally distilling off said styrene as the styrene is formed.

ROBERT C. PALMER.
CARLISLE H. BIBB.